United States Patent
Hsu et al.

(10) Patent No.: US 7,634,285 B2
(45) Date of Patent: Dec. 15, 2009

(54) WIRELESS COMMUNICATION SYSTEM USING CHANNEL ACCESS BASED ON A CONTENTION APPROACH AND METHOD THEREOF

(75) Inventors: Heng-Iang Hsu, Taipei (TW); Shiann-Tsong Sheu, Taipei (TW); Yun-Yen Shih, Taipei (TW); Yung-Ting Lee, Taipei (TW)

(73) Assignee: Institute for Information Industry, Taipei (TW)

( * ) Notice: Subject to any disclaimer, the term of this patent is extended or adjusted under 35 U.S.C. 154(b) by 837 days.

(21) Appl. No.: 11/250,528

(22) Filed: Oct. 17, 2005

(65) Prior Publication Data

US 2007/0036125 A1 Feb. 15, 2007

(30) Foreign Application Priority Data

Aug. 11, 2005 (TW) .............................. 94127279 A

(51) Int. Cl.
*H04B 7/00* (2006.01)
*H04J 3/16* (2006.01)
*H04L 12/413* (2006.01)
*H04L 12/43* (2006.01)

(52) U.S. Cl. ........................ 455/509; 370/346; 370/448; 370/461

(58) Field of Classification Search ................. 370/329, 370/341, 346, 448
See application file for complete search history.

(56) References Cited

U.S. PATENT DOCUMENTS 5,737,330 A * 4/1998 Fulthorp et al. ............. 370/346

* cited by examiner

*Primary Examiner*—Nick Corsaro
*Assistant Examiner*—Joel Ajayi
(74) *Attorney, Agent, or Firm*—Bacon & Thomas, PLLC

(57) ABSTRACT

A wireless communication system using channel access based on a contention approach and method thereof is disclosed, which allocates plural sets of time slots in a predetermined contention interval, wherein each set of time slots further includes plural adjacent overlapped time slots. A channel requester transmits a contention message to a channel allocator at a time slot based on an interleaved method after the channel requester completes count down of a predetermined time, so that the positions of the headers of the contention messages in the adjacent time slots of each set of time slot are different. Thus, if the contention message transmitted by the channel requester collides with the contention message of the adjacent time slot, the channel allocator can parse the headers of the collided contention messages and respectively allocate plural special channel times for communicating with the channel requesters.

20 Claims, 3 Drawing Sheets

WIRELESS COMMUNICATION SYSTEM USING CHANNEL ACCESS BASED ON A CONTENTION APPROACH AND METHOD THEREOF

BACKGROUND OF THE INVENTION

1. Field of the Invention

The present invention relates to a channel access method and, more particularly, to a wireless communication system using channel access based on a contention approach and method thereof.

2. Description of Related Art

With the development of electronic technology, the types of the portable wireless devices change rapidly, and the needs for the portable wireless devices increase greatly. The important key to design the portable wireless devices is how to access channel bandwidth effectively, wherein one important means for allocating channel bandwidth is accomplished through a contention mechanism.

The challenge for applying the contention mechanism is how the channel requester, such as a laptop computer, quickly communicates with a channel allocator, such as an access point (AP) in a limited contention interval for transmitting data.

Currently, there are several multiplex channel access methods available. One is to use a statistics method to allocate and divide the channel bandwidth into a reserve bandwidth and a contention bandwidth to raise the performance of channel access; another one is to segment the contention time slots in two-dimension in accordance with the time and coding scheme to transmit data randomly; and the third one is to allocate a special communication channel for each communication device in accordance with an orthogonal frequency division multiplexing (OFDM) method to transmit the access request sent by the channel request.

All the above methods utilize non-overlapped contention time slots to contend for the communication resource. Such methods can raise the success rate of communication. However, in these methods, the quantity of the original contention time slots is restricted and thus the improvement in the success rate of communication is also limited. In addition, the above methods do not effectively utilize the time of the contention interval, which results in wasting the channel access and reducing the success rate of communication. Therefore, it is desired for the above methods to be improved so as to effectively allocate the contention time slots thereby increasing the performance of channel access.

SUMMARY OF THE INVENTION

One object of the present invention is to provide a wireless communication system using channel access based on a contention approach and method thereof, which can increase the quantity of the contention time slots in a fixed interval without adding an external hardware device, and substantially increase the success rate of communication.

Another object of the present invention is to provide a wireless communication system using channel access based on a contention approach and method thereof, which can increase the success rate of parsing the headers of the collided contention message via the design of the transmitting message format.

According to the first aspect in this invention, a channel access method based on a contention approach is provided. The method allocates plural sets of time slots in a predetermined contention interval, wherein each set of time slots further includes plural adjacent overlapped time slots. The channel access method includes the step of: (A) a channel requester counting down a predetermined time; (B) when the predetermined time is reached, the channel requester transmits a contention message having a header to a channel allocator at a time slot in accordance with an interleaved method, thereby making positions of the headers of the contention messages in the adjacent time slots of each set of time slot to be different; (C) if the contention message transmitted by the channel requester collides with the contention message of the adjacent time slot, the channel allocator parses the headers of the collided contention messages; and (D) the channel allocator respectively allocates plural special channel times for communicating with the channel requesters.

According to the second aspect in this invention, a wireless communication system using channel access based on a contention approach is provided. The wireless communication system allocates plural sets of time slot in a predetermined contention interval, wherein each set of time slots further includes plural adjacent overlapped time slots. The wireless communication system includes: at least one channel allocator; and plural channel requesters, each channel requester transmitting a contention message having a header to one of the channel allocators based on an interleaved method after counting down a predetermined time, thereby making positions of the headers of the contention messages in the adjacent time slots of each set of time slot to be different, wherein if the contention message transmitted by the channel requester collides with the contention message of the adjacent time slot, the channel allocator respectively parses the headers of the contention messages transmitted by the channel requesters, and then the channel allocator respectively allocates plural special channel times for the channel requesters for communicating with the channel requesters.

Each set of time slots includes a first time slot and a second time slot, and the start of the second time slot follows the back of the header of the first time slot.

The interleaved method is provided to make the most significant bit (MSB) of the odd time slot in each set of time slot be first transmitted and the least significant bit (LSB) of the even time slot in each set of time slot is first transmitted. Alternatively, it is also applicable to make the least significant bit of the odd time slot in each set of time slot be first transmitted and the most significant bit of the even time slot in each set of time slot is first transmitted. Thus, the interleaved method can make the headers on the contention messages not overlap.

Further, if the contention message transmitted by the channel requester does not collide with the contention message of the adjacent time slot, the channel requester is able to communicate with the channel allocator. If the contention message transmitted by the channel requester collides with the contention message of the same time slot, the channel requester counts down a predetermined time again and then transmits a contention message to a channel allocator.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
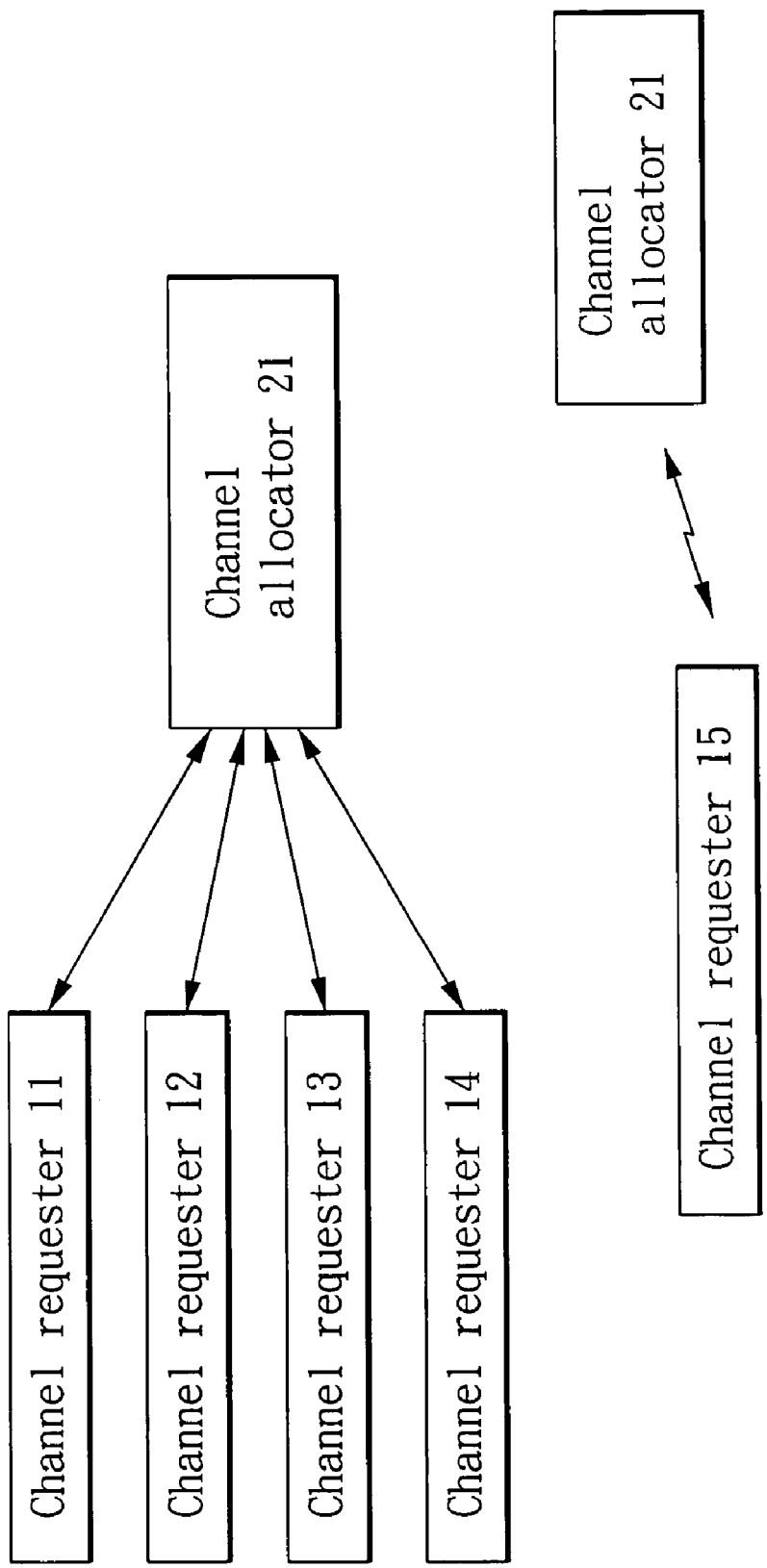
FIG. 1 is a schematic diagram showing a system profile according to the preferred embodiment of the present invention.

FIG. 1 is a schematic diagram showing system profile according to the preferred embodiment of the present invention, which includes plural channel requesters 11, 12, 13, 14, 15 and plural channel allocators 21, 22. In this embodiment, the channel allocator 21, 22 may be an access point (AP). The channel requester 11, 12, 13, 14, 15 may be a terminal device with a wireless network card, such as a laptop or a personal digital assistant (PDA). In other embodiments, the channel allocator 21, 22 may be a base station. The channel requester 11, 12, 13, 14, 15 may be a mobile phone. In addition, the present invention can be applied to the wireless communication system that accomplishes the communication through a contention mechanism, such as ultra wideband (UWB) or IEEE 802.16.

Figure 2:
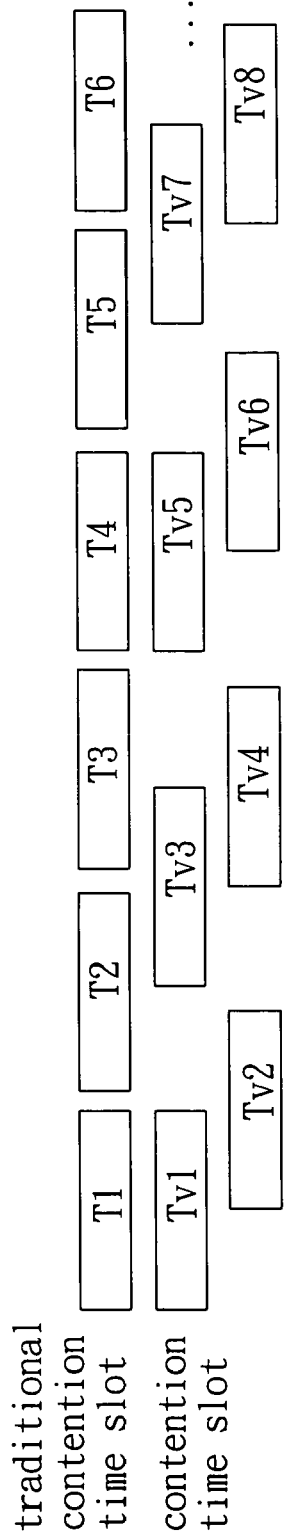
FIG. 2 is a schematic diagram showing a contention time slot structure according to the preferred embodiment of the present invention.

The present invention is different from the conventional means in that the present invention changes the contention time slot structure to increase the quantity of the transmitted contention messages. FIG. 2 shows the contention time slot structure according to a preferred embodiment of the present invention. Please refer to FIG. 1 and FIG. 2. The conventional means allocates plural non-overlapped contention time slots T1, T2, T3, T4, T5, T6 so that the channel requesters 11, 12, 13, 14, 15 respectively transmit a contention message in one of the non-overlapped contention time slots T1, T2, T3, T4, T5, T6. However, in the conventional means, the time slots are not overlapped, so the quantity of time slots available is limited.

In this embodiment, plural contention time slots Tv1, Tv2, Tv3, Tv4, Tv5, Tv6, Tv7, Tv8, ... are allocated in a predetermined interval, wherein two adjacent contention time slots form a set of contention time slots. Further, the start of one of the contention time slots follows the back of the header of the adjacent contention time slot (the other contention time slot). For example, the contention time slot Tv1 and the contention time slot Tv2 are allocated in one set of the contention time slots, and the start of the contention time slot Tv2 follows the back of the header of the contention time slot Tv1. Similarly, the contention time slot Tv3 and the contention time slot Tv4 are allocated in one set of the contention time slot, and the start of the contention time slot Tv4 follows the back of the header of the contention time slot Tv3.

Therefore, if the length of the header is K percent of the length of the contention message, the quantity of the contention time slots can be increased to 2N/(1+K %). For example, if there are six contention time slots, such as T1, T2, T3, T4, T5, T6, and the length of the header is fifty percent of the length of the contention message, the quantity of the contention time slots is increased from six to eight.

Since the adjacent contention time slots in one set of the contention time slot are overlapped in the contention time slot structure provided by the present invention, there is a need for parsing the header of the contention messages which have collided.

Figure 3:
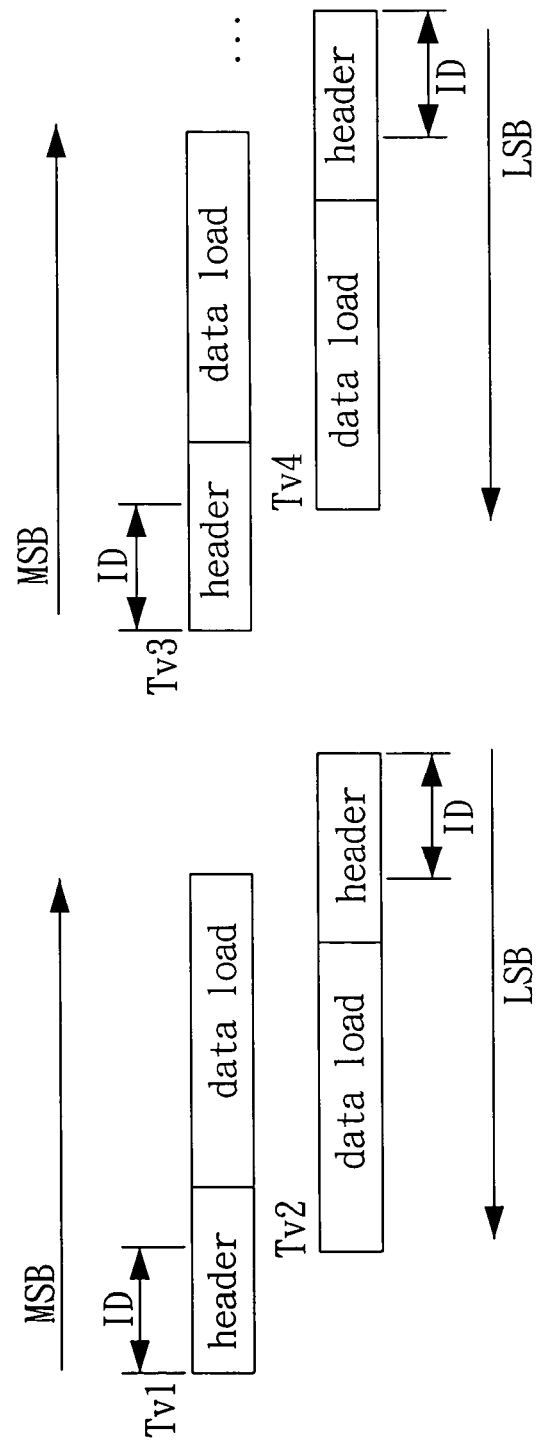
FIG. 3 is a schematic diagram showing a method for transmitting a contention message according to the preferred embodiment of the present invention.

FIG. 3 is a schematic diagram showing the transmission of the contention message according to the preferred embodiment. In order to parse the header of the collided contention messages, the channel requesters transmit the contention messages to the channel allocator based on an interleaved method. For example, the format of the contention messages is accomplished as follows: the most significant bit (MSB) is first transmitted in each odd contention time slot of each set of the contention time slot, and the least significant bit (LSB) is first transmitted in each even contention time slot of each set of the contention time slot. Alternatively, the format of the contention messages may also be accomplished as follows: the least significant bit (LSB) is first transmitted in each odd contention time slot of each set of the contention time slot, and the most significant bit (MSB) is first transmitted in each even contention time slot of each set of the contention time slot. Thus, the interleaved method makes the header not overlap.

Thus, the channel allocator is able to recognize the channel requester via parsing the header of the contention message, and thus avoid not parsing the headers of the collided contention messages. Therefore, the success rate for the channel requesters communicating with the channel allocator can be increased based on the foregoing contention time slot structure and the transmission of the contention messages.

Figure 4:
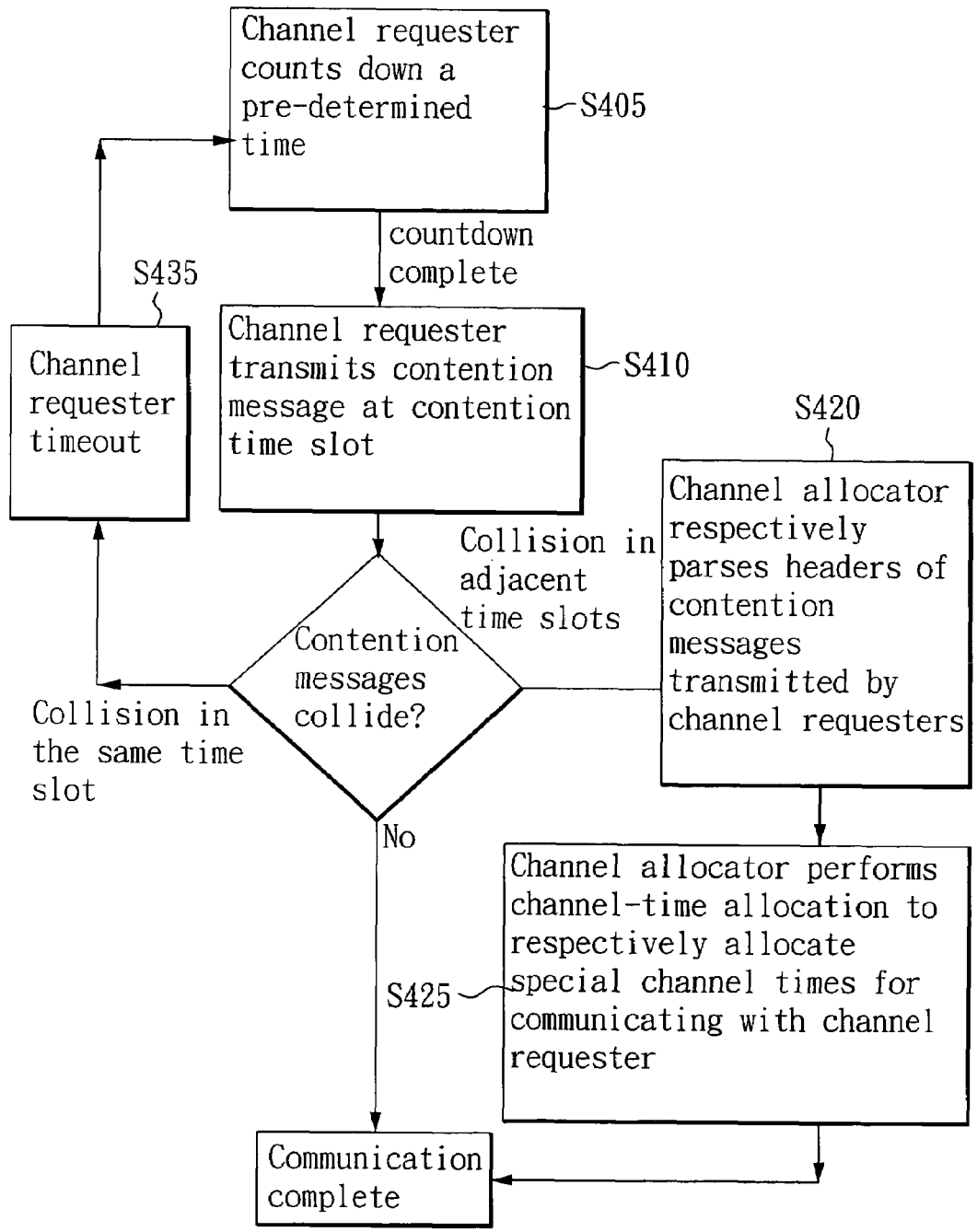
FIG. 4 is a flowchart according to the preferred embodiment of the present invention.

FIG. 4 is a flowchart showing the channel access method according to the preferred embodiment of the present invention. Please also refer to the FIG. 1 and FIG. 2 for depiction of the flowchart. In general, the channel allocator 21 uses a predetermined contention interval TP to communicate with each channel requester 11, 12, 13, 14. When the channel requester 11 wants to communicate with the channel allocator 21, the channel requester will first count down a predetermined time, such as 3 seconds (S405).

It is note that the predetermined times for each channel requester 11, 12, 13, 14 may be the same or different. For instance, the predetermined time for the channel requester 11 is 3 seconds, the predetermined time for the channel requester 12 is 1 second, the predetermined time for the channel requester 13 is 4 seconds, and the predetermined time for the channel requester 14 is 5 seconds. In other words, the predetermined times that the channel requesters count down are generated at random.

The channel requester 11 transmits a contention message to the contention time slot Tv3 in accordance with the interleaved method after the countdown for the channel requester 11 is completed. However, the contention message transmitted by the channel requester 11 may be collided, for instance, when the collision occurs in the adjacent time slots, the channel requester 13 transmits the contention message at the contention time slot Tv4 so that the contention message transmitted by the channel requester 11 collides with the contention message transmitted by the channel requester 13.

Since the channel requesters 11, 13 transmit the contention message based on the interleaved method, the channel requester 11 transmits the contention message in accordance with an MSB manner, and the channel requester 13 transmits the contention message in accordance with an LSB manner. Thus, the header of the contention message transmitted by the channel requester 11 is in front of the contention message. The header of the contention message transmitted by the channel requester 13 is at the back of the contention message.

Therefore, the channel allocator 21 can respectively parse the headers of the contention messages transmitted by the channel requester 11, 13 (S420). Subsequently, the channel allocator 21 performs a channel access time allocation to respectively allocate plural special channel times to the channel requesters 11, 13, and then the channel allocator 21 respectively communicates with the channel requesters in the various special channel times.

Alternatively, the contention message may not be collided after the channel requester 11 has transmitted, so the channel requester 11 can successfully communicate with the channel allocator 21.

On the other hand, the contention messages may be collided in the same contention time slot after the channel requesters transmit the contention message. For example, if the channel requester 13 transmits the contention message at the contention time slot Tv3 at which the channel requester 11 transmits the contention message, the contention message transmitted by the channel requester 11 collides with the contention message transmitted by the channel requester 13 at the same contention time slot Tv3. Thus, after timeout for the channel requesters 11, 13, the channel requesters 11, 13 respectively count down the predetermined times again. For example, the channel requester 11 count down 4 seconds, and the channel requester 13 counts down 1 second (step S435), thereby contending for communicating with the channel allocator 21 again.

In view of the foregoing, it is known that the present invention utilizes the contention time slots which are overlapped to increase the quantity of the contention time slots in a fixed interval, and transmits the contention messages based on the interleaved method to make the position of the headers of the contention messages in the same set of time slot be different. Therefore, when the contention messages are collided in the adjacent time slots, the channel allocator can respectively parse the headers of the contention messages to increase the performance of channel access.

Although the present invention has been explained in relation to its preferred embodiment, it is to be understood that many other possible modifications and variations can be made without departing from the spirit and scope of the invention as hereinafter claimed.

What is claimed is:

1. A channel access method based on a contention approach, which allocates plural sets of time slots in a predetermined contention interval, each set of time slots including plural adjacent overlapped time slots, the channel access method comprising the steps of:
    (A) a channel requester counting down a predetermined time;
    (B) when the predetermined time is reached, the channel requester transmitting a contention message having a header to a channel allocator at a time slot in accordance with an interleave method, which is provided to make the most significant bit of the odd time slot in each set of time slot be first transmitted and the least significant bit of the even time slot in each set of time slot be first transmitted, thereby making positions of the headers of the contention messages in the adjacent time slots of each set of time slot be different;
    (C) if the contention message transmitted by the channel requester collides with the contention message of the adjacent time slot, the channel allocator parsing the headers of the collided contention messages; and
    (D) the channel allocator respectively allocating plural special channel times for communicating with the channel requesters.

2. The channel access method as claimed in claim 1, wherein each set of time slots includes a first time slot and a second time slot, and the second time slot follows the header of the first time slot.

3. The channel access method as claimed in claim 1, wherein in the step (C), if the contention message transmitted by the channel requester does not collide with the contention message of the adjacent time slot, the channel requester communicates with the channel allocator.

4. The channel access method as claimed in claim 1, wherein in the step (C), if the contention message transmitted by the channel requester collides with the contention message of the same time slot, the channel requester performs the step (A) again after timeout for the channel requester.

5. The channel access method as claimed in claim 1, wherein in the step (C), the channel allocator recognizes the channel requesters via parsing the headers of the contention messages transmitted by the channel requesters.

6. A wireless communication system using channel access based on a contention approach, which allocates plural sets of time slots in a predetermined contention interval, wherein each set of time slot includes plural adjacent overlapped time slots, the wireless communication system comprising:
    at least one channel allocator; and
    plural channel requesters, each channel requester transmitting a contention message having a header to one of the channel allocators based on an interleaved method after counting down a predetermined time, thereby making the positions of the headers of the contention messages in the adjacent time slots of the each set of time slot to be different, wherein if the contention message transmitted by the channel requester collides with the contention message of the adjacent time slot, the channel allocator respectively parses the headers of the contention messages transmitted by the channel requesters, and then the channel allocator respectively allocates plural special channel times for the channel requesters for communicating with the channel requesters, wherein the interleaved method is provided to make the most significant bit of the odd time slot in each set of time slot be first transmitted and the least significant bit of the even time slot in each set of time slot be first transmitted.

7. The wireless communication system as claimed in claim 6, wherein each set of time slot includes a first time slot and a second time slot, and the second time slot follows the header of the first time slot.

8. The wireless communication system as claimed in claim 6, wherein if the contention message transmitted by the channel requester does not collide with the contention message of the adjacent time slot the requester communicates with the channel allocator.

9. The wireless communication system as claimed in claim 6, wherein if the contention message transmitted by the channel requester collides with the contention message of the time slot of the same, the channel requester performs step (A) again after timeout for the channel requester.

10. The wireless communication system as claimed in claim 6, wherein the channel allocator recognizes the channel requesters via parsing the headers of the contention messages transmitted by the channel requesters.

11. A channel access method based on a contention approach, which allocates plural sets of time slots in a predetermined contention interval, each set of time slots including plural adjacent overlapped time slots, the channel access method comprising the steps of:
    (A) a channel, requester counting down a predetermined time;
    (B) when the predetermined time is reached, the channel requester transmitting a contention message having a header to a channel allocator at a time slot in accordance with an interleave method, which is provided to make the least significant bit of the odd time slot in each set of time slot be first transmitted and the most significant bit of the even time slot in each set of time slot be first transmitted, thereby making positions of the headers of the contention messages in the adjacent time slots of each set of time slot be different;

(C) if the contention message transmitted by the channel requester collides with the contention message of the adjacent time slot, the channel allocator parsing the headers of the collided contention messages; and (D) the channel allocator respectively allocating plural special channel times for communicating with the channel requesters.

12. The channel access method as claimed in claim 11, wherein each set of time slots includes a first time slot and a second time slot, and the second time slot follows the header of the first time slot.

13. The channel access method as claimed in claim 11, wherein in the step (C), if the contention message transmitted by the channel requester does not collide with the contention message of the adjacent time slot, the channel requester communicates with the channel allocator.

14. The channel access method as claimed in claim 11, wherein in the step (C), if the contention message transmitted by the channel requester collides with the contention message of the same time slot, the channel requester performs the step (A) again after timeout for the channel requester.

15. The channel access method as claimed in claim 11, wherein in the step (C), the channel allocator recognizes the channel requesters via parsing the headers of the contention messages transmitted by the channel requesters.

16. A wireless communication system using channel access based on a contention approach, which allocates plural sets of time slots in a predetermined contention interval, wherein each set of time slot includes plural adjacent overlapped time slots, the wireless communication system comprising:

at least one channel allocator; and plural channel requesters, each channel requester transmitting a contention message having a header to one of the channel allocators based on an interleaved method after counting down a predetermined time, thereby making the positions of the headers of the contention messages in the adjacent time slots of the each set of time slot to be different, wherein if the contention message transmitted by the channel requester collides with the contention message of the adjacent time slot, the channel allocator respectively parses the headers of the contention messages transmitted by the channel requesters, and then the channel allocator respectively allocates plural special channel times for the channel requesters for communicating with the channel requesters, wherein the interleaved method is provided to make transmitting the least significant bit of the odd time slot in each set of time slot be first transmitted and the most significant bit of the even time slot in each set of time slot be first transmitted.

17. The wireless communication system as claimed in claim 16, wherein each set of time slot includes a first time slot and a second time slot, and the second time slot follows the header of the first time slot.

18. The wireless communication system as claimed in claim 16, wherein if the contention message transmitted by the channel requester does not collide with the contention message of the adjacent time slot, the requester communicates with the channel allocator.

19. The wireless communication system as claimed in claim 16, wherein if the contention message transmitted by the channel requester collides with the contention message of the time slot of the same, the channel requester performs step (A) again after timeout for the channel requester.

20. The wireless communication system as claimed in claim 16, wherein the channel allocator recognizes the channel requesters via parsing the headers of the contention messages transmitted by the channel requesters.

* * * * *

UNITED STATES PATENT AND TRADEMARK OFFICE
CERTIFICATE OF CORRECTION

PATENT NO. : 7,634,285 B2 Page 1 of 1
APPLICATION NO. : 11/250528
DATED : December 15, 2009
INVENTOR(S) : Hsu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1094 days.

Signed and Sealed this

Twenty-first Day of December, 2010

David J. Kappos
*Director of the United States Patent and Trademark Office*